Feb. 3, 1970    R. HEANEY ET AL    3,493,127
METHOD OF AND APPARATUS FOR SINGULATING ARTICLES
Filed Nov. 20, 1967    11 Sheets-Sheet 1

FIG_1

INVENTORS
RICHARD HEANEY, DEREK HALL,
FRANK W. HADLEY JR.,
BY F.W. Anderson
C.E. Tripp
ATTORNEYS

FIG_14

Feb. 3, 1970  R. HEANEY ET AL  3,493,127
METHOD OF AND APPARATUS FOR SINGULATING ARTICLES
Filed Nov. 20, 1967  11 Sheets-Sheet 10

INVENTORS.
RICHARD HEANEY, DEREK HALL,
FRANK W. HADLEY JR.,

BY

ATTORNEYS

Feb. 3, 1970    R. HEANEY ET AL    3,493,127
METHOD OF AND APPARATUS FOR SINGULATING ARTICLES
Filed Nov. 20, 1967    11 Sheets-Sheet 11

INVENTORS.
RICHARD HEANEY, DEREK HALL,
FRANK W. HADLEY JR.
BY F.W. Anderson
C.E. Tripp
ATTORNEYS

United States Patent Office 3,493,127
Patented Feb. 3, 1970

3,493,127
METHOD OF AND APPARATUS FOR SINGULATING ARTICLES
Richard Heaney, Campbell, Derek Hall, Los Gatos, and Frank W. Hadley, Jr., Shell Beach, Calif., assignors to FMC Corporation, San Jose, Calif., a corporation of Delaware
Filed Nov. 20, 1967, Ser. No. 684,212
Int. Cl. B65g 59/04
U.S. Cl. 214—8.5    15 Claims

ABSTRACT OF THE DISCLOSURE

A pair of vacuum heads mounted at the end of articulated linkages are arranged to alternately grip and remove letters from a single file stack of letters presented broadside to the heads. Each head grips the foremost letter in the stack, carries it away from the stack with a quick, snatching action and moves it along a path that is generally perpendicular to the face of the letter next behind, and then elevates the letter to a take-away conveyor.

BACKGROUND OF THE INVENTION

This invention concerns apparatus for removing the leading article, such as an envelope, from a file of such items that are disposed in face-to-face relation in the manner that stacks of envelopes are positioned on edge in a tray one behind the other. The problem involved in attempting to remove the leading envelope is due to the fact that the envelopes tend to cling to each other, and often two envelopes instead of one are picked up. This adherence of the foremost envelope to the envelope next behind is aggravated by the fact that pressure is usually applied to the stack to urge the stack forward to move the foremost envelope to the pick-up position against a stop member, such as a positioning member or the suction head which is about to grip the envelope. Pick-up heads previously available were arranged to separate the foremost letter from the letter next behind by sliding the foremost letter laterally. However, such lateral movement does not effectively break the bond between the envelopes, and the removal of two envelopes at a time sometimes results.

In the present invention, the linkage which actuates the pick-up head causes it to move along a path substantially normal to the face of the envelope next behind so that the foremost envelope is removed with a snatching action to effectively separate the envelopes.

SUMMARY OF THE INVENTION

A pair of vacuum heads are arranged to alternately move into gripping engagement with the foremost envelopes in a file of envelopes in a tray, remove said envelopes one-by-one and carry them to an elevated conveyor. The movement of each head is controlled by a cam-actuated linkage that moves the heads in 180 degrees out-of-phase relation so that, while one head deposits an envelope on the elevated conveyor, the other head picks up an envelope from the stack with the above-mentioned, effective snatching action. Sensing fingers are provided to guide the foremost envelope to pick-up position, and these fingers and the tray in which the envelopes are carried are controlled by a hydraulic system whereby the fingers are brought to a position in front of the foremost envelope at a point forwardly of the pick-up position, and the tray is advanced to bring the foremost envelope into contact with the sensing fingers and to move the fingers rearwardly. When the envelope reaches the pick-up station and the envelope is gripped by the vacuum head, the movement of the tray is stopped, the sensing fingers are retracted, and the vacuum head is moved rearwardly with a snatching action that separates the letters from the letter next behind.

It is therefore an object of the present invention to provide an effective method and apparatus for removing the foremost article from a stack or file of articles. While the apparatus of the present invention is particularly adapted to separate the foremost letter from a stack of letters positioned in a tray, it will be understood that the apparatus may be utilized to singulate any stack or file of articles that have relatively large flat faces and are stacked in face-to-face condition.

DESCRIPTION OF THE PREFERRED EMBODIMENT

Figure 1:
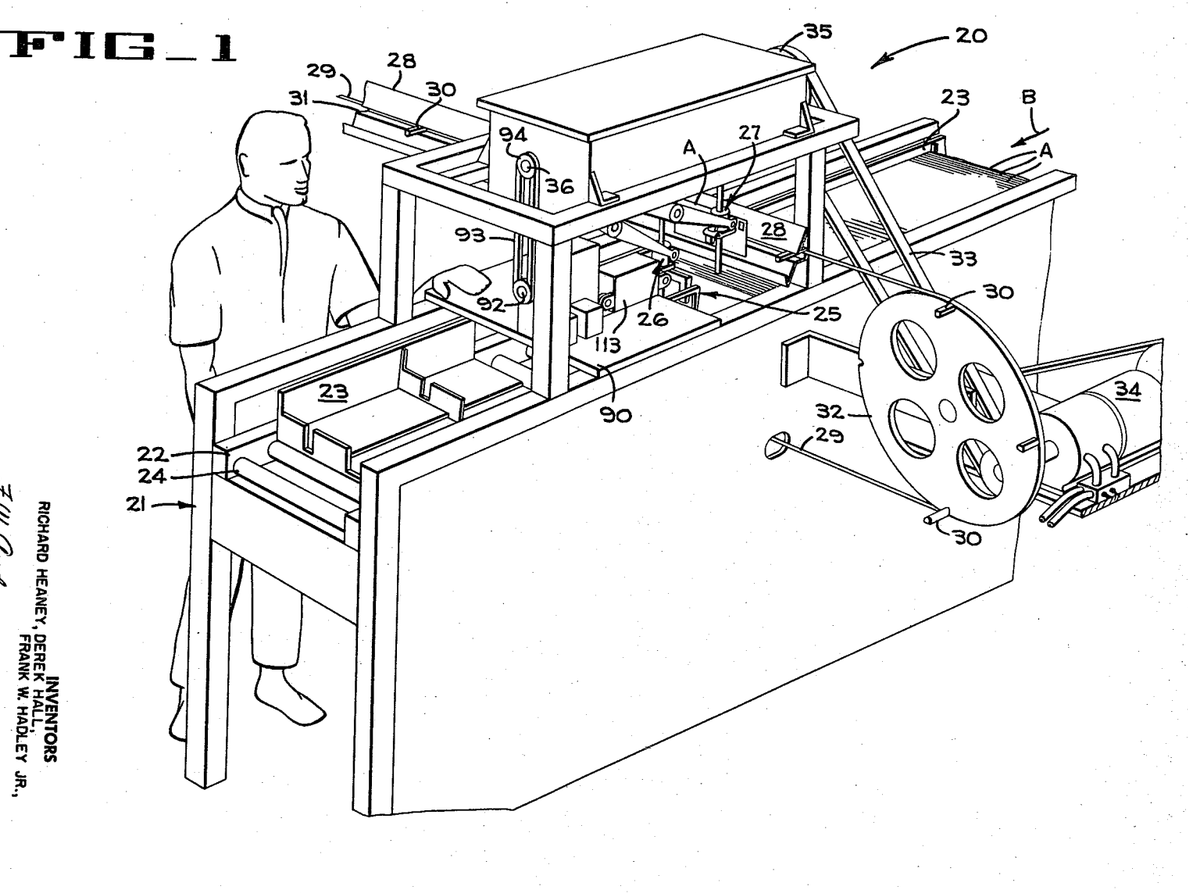
FIGURE 1 is a perspective view of a letter singulator unit as mounted on a letter handling machine.

Referring now to FIG. 1 an operator is shown standing beside a letter singulator device, designated generally by the numeral 20. Such letter singulator device 20 in the preferred embodiment may be used in the letter handling and distribution system as shown in Sassen et al. Patent No. 3,219,204 entitled "Method of and Apparatus For Handling Articles." As mentioned in that patent, the handling of large volumes of mail has necessitated more automated systems to increase the efficiency of letter handling, and the letter singulator device 20 performs an important part in such a system since the device 20 has the ability to singulate letters from a container or tray which holds a plurality of letters of various sizes. It is to be understood, however, that the singulation of articles need not be restricted to letters nor to the system disclosed in the Sassen et al. patent, supra. However, it has been found that the letter singulator device 20 as described hereinafter is capable of singulating approximately 4 letters per second.

The letter singulator device 20 is mounted on a support structure 21 in which is provided a conveyor channel 22 for receiving letter holding trays 23. A tray 23 is shown containing a plurality of letters A prior to singulation, and one tray is shown in an empty condition. In general, the trays 23 are moved in the direction of arrow B toward the letter singulator device 20 on a roller conveyor 24 in which some of the rollers are powered to move the trays 23 along channel 22 as will be described in greater detail hereinafter. As the tray 23 carries the letters A into engagement with a sensing device 25, singulator heads 26 and 27 alternately pick up a letter A from the tray 23 and deposit the letter on an easel 28. A length of endless steel tape 29 with equally spaced letter propelling lugs 30 runs in a recess 31 of easel 28, and the steel tape 29 is driven as described in said Sassen et al. patent over a pulley 32. The propelling lugs 30 on tape 29 are preferably spaced approximately fourteen inches apart so as to handle most of the sizes of letters normally singulated in a post office installation.

As the trays 23 are emptied of letters by the singulating heads 26 and 27, the trays are conveyed along conveyor channel 22 to the end thereof where the trays may be removed for refilling.

Figure 2:
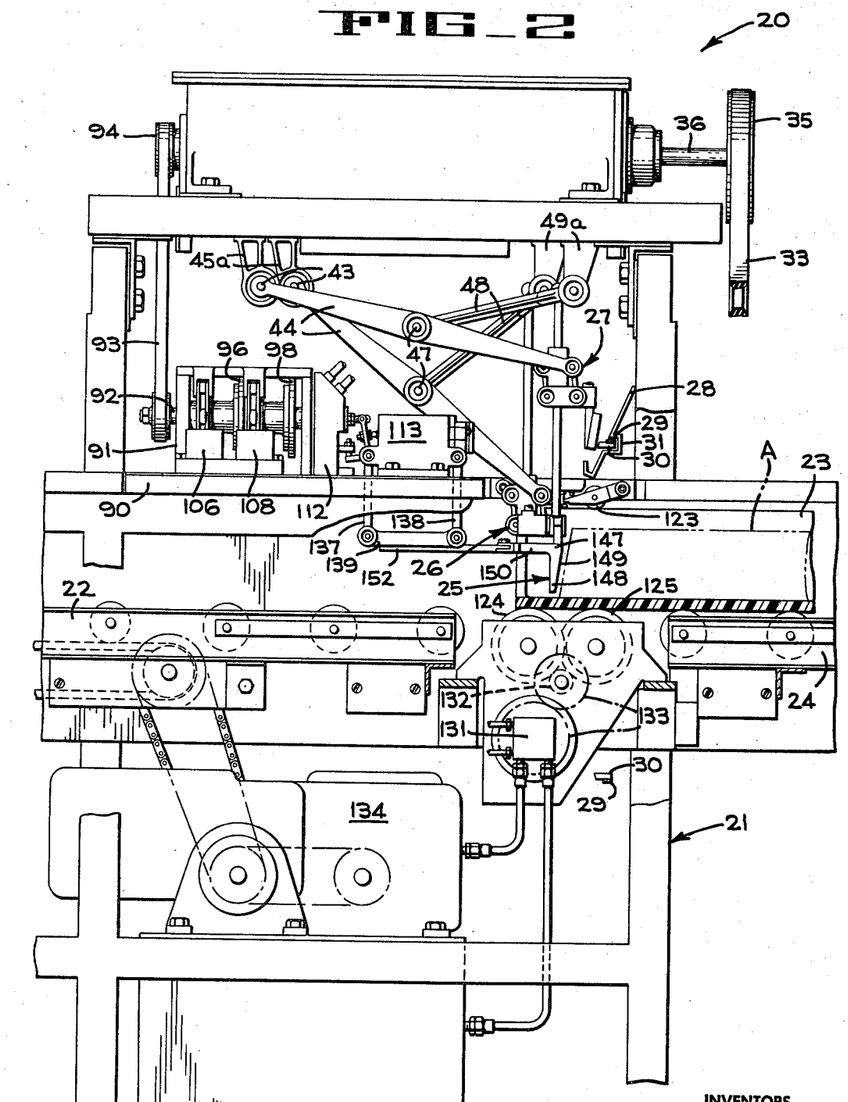
FIGURE 2 is an enlarged side elevation of the letter singulator unit of FIG. 1.

Referring now to FIG. 2, the letter singulator device 20 is shown in greater detail with singulator head 26 in position to pick up a letter A from tray 23 and singulator head 27 in position to discharge a letter onto easel 28. The letter singulator device 20 is powered by a belt 33 (FIG. 1) from a suitable power source 34. The belt 33 turns a pulley 35 (FIG. 2) keyed to a shaft 36. Also keyed to shaft 36 and rotated therewith is a barrel cam 40 as shown in FIG. 4.

Figures 5, 6, 7:
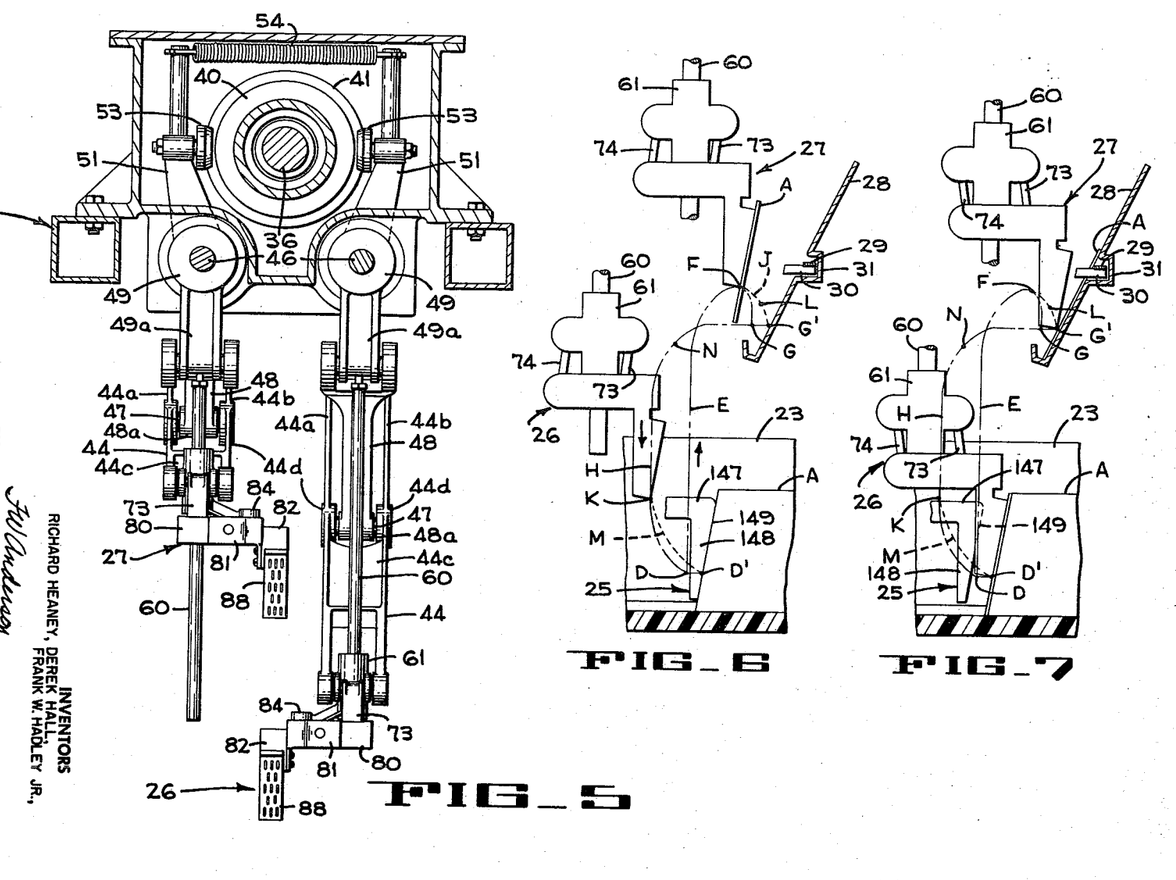
FIGURE 5 is a vertical section taken along line 5—5 of FIG. 4.
FIGURE 6 is a schematic of a singulator head and its path with an envelope held in an upper position prior to deposit on an easel.
FIGURE 7 is a schematic showing a singulator head in envelope pick up position.

In general, as the barrel cam 40 is rotated by belt 33, the linkages interconnected to the barrel cam 40 and singulator heads 26 and 27 cause the heads to move in a modified figure 8 pattern as shown in phantom lines in FIGS. 6 and 7. Air and vacuum are applied to the singulator heads 26 and 27 in a predetermined manner as will be described in greater detail hereinafter, but it should be noted that each time one singulator head is in an uppermost position ready for discharge of a letter, the other singulator head is in a lowermost position ready to pick up a letter from the tray 23, thus making the heads 180° out of phase.

Figure 4:
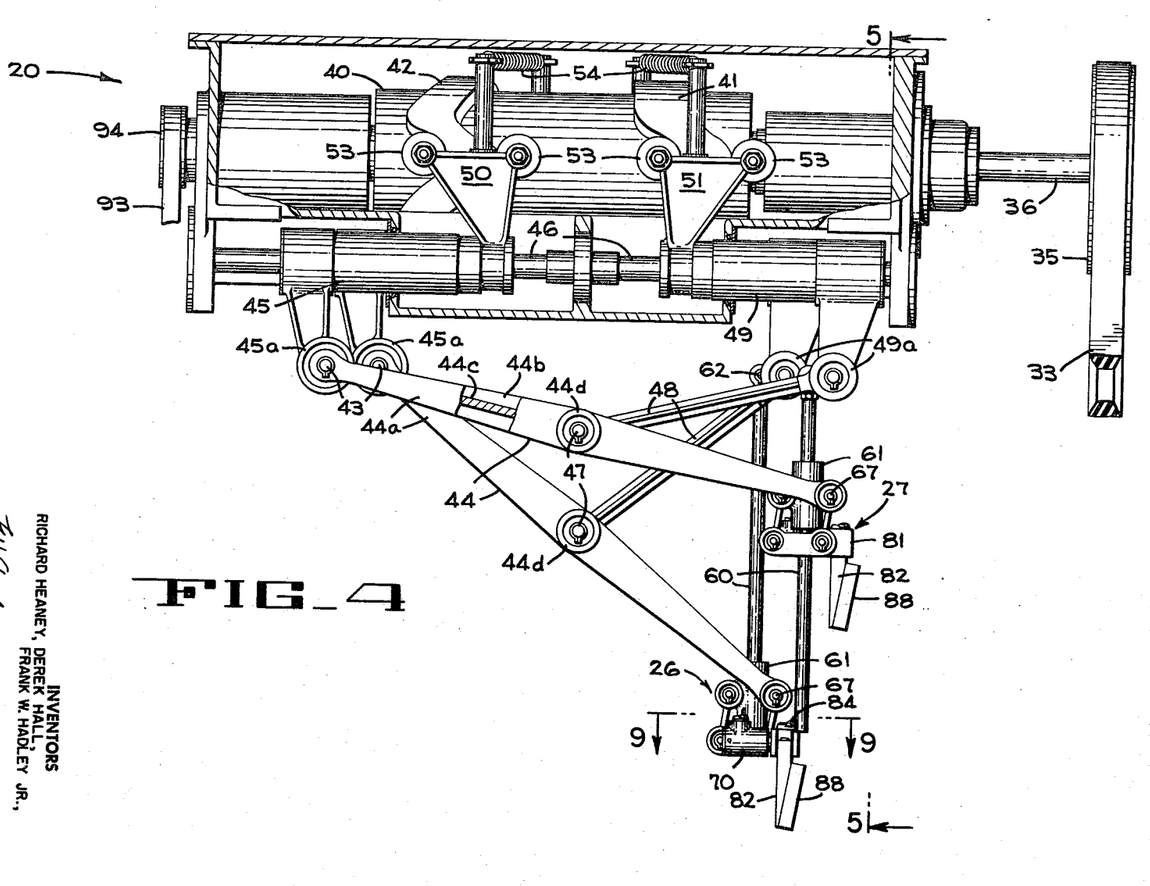
FIGURE 4 is an enlarged elevation of a portion of the singulator unit of FIG. 2.

The structure for imparting movement to the singulator heads 26 and 27 is best disclosed in FIGS. 4 and 5, while FIGS. 6 and 7 disclose the path taken by the singulator heads when actuated by the rotation of the barrel cam 40 and associated linkage.

The barrel cam 40 is provided with a raised cam track portion 41 and a raised cam track portion 42 wherein both cam track portions extend around the barrel cam.

Each singulator head 26 and 27 is connected to a rearwardly extending link 44 which is pivotally mounted at 43 on a flange 45a of a slidable carriage 45 that is free to slide upon carriage guide rods 46 mounted on either side of said barrel cam 40, as shown in FIGURES 4 and 5.

Each link 44 comprises a pair of parallel flat members 44a and 44b (FIG. 5) connected by a web 44c. A pair of hubs 44d pivotally mount each link 44 on a shaft 47 carried by a hub 48a of a lever 48. Each lever 48 is, in turn, pivotally connected to a depending flange 49a (FIG. 4) of a tubular carriage member 49 that is slidably mounted upon one of the guide rods 46.

Projecting upwardly from each of the carriage members 45 and 49 is an extension member 50 and 51, respectively, each of which mounts a pair of rotatably mounted cam followers 53 which engage the cam tracks 41 and 42 on either side thereof and thus transfer the cam movement smoothly and effectively to the slidable carriage 45 and 49. The oppositely positioned carriages 45 and the oppositely positioned carriages 49 for the singulator heads are joined together by springs 54 as viewed in FIGURES 4 and 5.

As the barrel cam 40 is rotated, the cam track portions 41 and 42 rotate therewith and reciprocate the carriages 45 and 49 along the carriage guide rods 46. As the carriages are moved in accordance with cam action, the respective singulator heads are positioned through the connecting linkage 44, 48 to take a path as shown in FIGURES 6 and 7. The cams and linkages are arranged so that when one singulator head is in an uppermost position of the path, the other singulator head is in a lowermost position of the path.

There are advantages in having the singulator heads 26 and 27 disposed in 180° out of phase relation, so to speak, in that this arrangement helps simplify the use of air and vacuum in conjunction with letter singulation as will be described in greater detail hereinafter.

Thus, with the barrel cam 40 rotated by belt 33, the two singulator heads 26 and 27 are simultaneously moved through predetermined paths, thereby allowing each head to alternate from letter pick-up position to letter discharge position. The visual effect of the operation of the linkage 44 and 48 and the movement of the heads 26 and 27 resembled the front leg action of a trotter horse and the speed of movement is such that it is possible to handle 4 letters per second.

Figure 8:
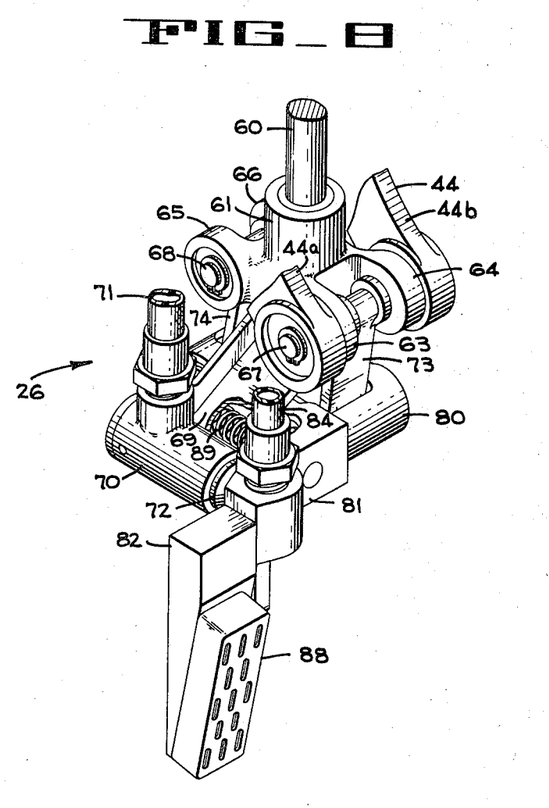
FIGURE 8 is a perspective view of a singulator head.

The heads 26 and 27 are identical, only oppositely disposed and, accordingly, only head 26 will be described in detail. As best seen in FIG. 8, the head 26 has a tubular body portion 61 that is slidably disposed on a rod 60 which depends from the carriage flange 49a and is pivotally mounted thereon by a pin 62 (FIG. 4). Four flanges 63–66 (FIG. 8) are formed on the body portion 61, flanges 63 and 64 having aligned bores, that rotatably support a pivot pin 67, and flanges 65 and 66 having aligned bores that rotatably receive a pivot pin 68. The pivot pin 67 is also pivotally received in bores in hubs formed on the ends of the members 44a and 44b of link 44. The body 61 also is provided with an integrally formed web 69 that projects outwardly and downwardly and carries, at its outer end, the housing of a pneumatic power cylinder 70. The cylinder 70 is provided with an air conduit 71, and a piston 72.

Figure 9:
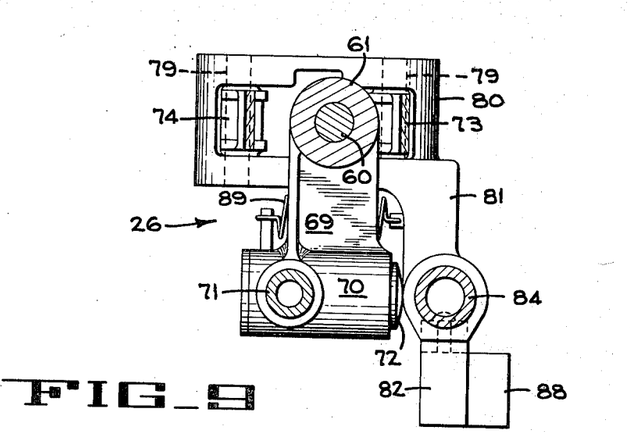
FIGURE 9 is a section taken along line 9—9 of FIG. 4.

The pivot pins 67 and 68 pivotally support a pair of parallel links 73 and 74 (FIG. 10) respectively. As seen in FIG. 9, the lower end of each link 73 and 74 passes through an opening in a hollow support block 80, and each link is pivotally connected to a pivot pin 79 mounted in the block. With this arrangement the links 73 and 74 form a parallelogram linkage that causes the support block 80 to move in a substantially horizontal plane.

The block 80 has an arm 81 (FIG. 9) formed thereon to which is connected a manifold 82. The manifold has a flow passage 83 (FIG. 12) which communicates with a conduit 84 (FIG. 9) connected to the arm 81, and which also communicates through a keyhole-like slot 85 (FIG. 11) with a recess 86 (FIG. 12) formed in the face of a letter-engaging member 87 which is secured to the manifold 82. A perforated rubber membrane 88 is secured over the recess 86.

Figures 10, 11, 12:
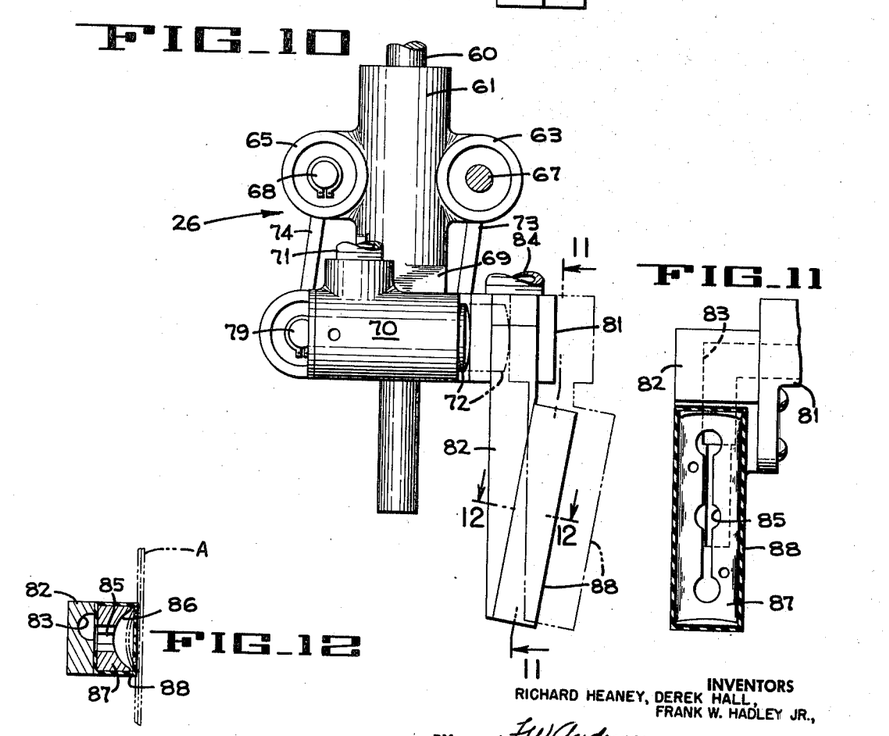
FIGURE 10 is an elevation view of the singulator head of FIG. 9.
FIGURE 11 is a sectional view of the head taken along 11—11 of FIG. 10.
FIGURE 12 is a sectional view taken along 12—12 of FIGURE 10.

As seen in FIGURES 9 and 10, the rear face of the arm 81 abuts the piston 72 of the air cylinder 70. At certain intervals during the operation of the head, the cylinder 70 is energized to move the piston outwardly and move the arm 81 and the member 87 to the right (FIG. 10) under the guidance of the parallel links 73 and 74 and against the resistance of a spring 89 (FIG. 9) that is connected between the housing of the cylinder 70 and the support arm 81. When the cylinder is de-energized, the spring will of course return the member 87 to its retracted or rearward position.

Figure 3:
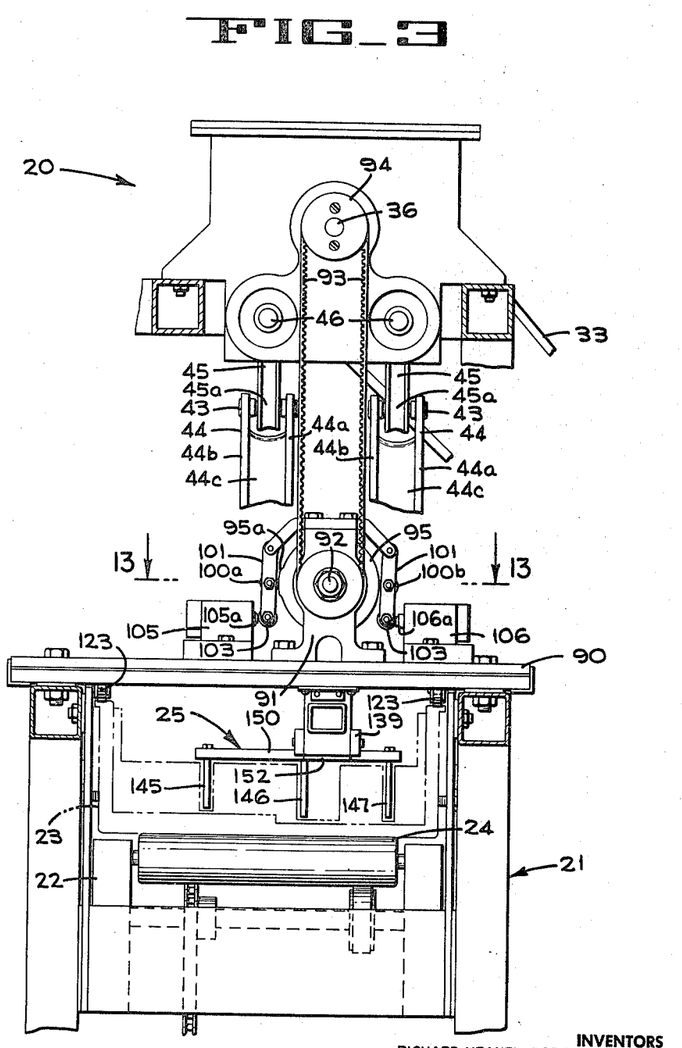
FIGURE 3 is an end elevation view of the singulator unit of FIG. 2.

Mounted on a platform 90 of support structure 21 (FIG. 2) is a cam support unit 91 having a shaft 92 rotatably by a belt 93 from pulley 94 mounted on shaft 36. The shaft 92 turns at the same rotary speed as shaft 36. Cams 95, 96, 97 and 98 (FIG. 13) are mounted on shaft 92 for rotation therewith. Cam followers 100a–100e are engageable against the surface of the respective cams, each cam follower being rotatably mounted near the midpoint of a lever 101 (FIG. 3) that carries a second roller 103 at its lower end. Each of the valve stems 105a, 106a, 107a, 108a and 109a of valves 105, 106, 107, 108 and 109 respectively is in engagement with one of the lower rollers 103 and is positioned by the rotation of the associated cam to connect or disconnect the valve to a vacuum line or to an air-pressure line.

Each of the valve stems of the valves 105, 106, 107, 108 and 109 is urged by a spring 99 (FIG. 13) against the associated lower roller 103 so that the positioning of the valve stems are in accordance with cam position. In FIG. 14 the valve stems are shown schematically as being in direct contact with the cam rather than with the lower roller for simplicity. Valves 105 and 106 are each connected to a conduit 110 (FIG. 14) leading to a source of pressurized air and to a conduit 111 leading to a vacuum supply. The cam 95 is provided with a single lobe 95a. When the singulator head 26 is in a lowermost position (FIG. 14), the conduit 84 is connected to the vacuum supply through valve 106 by the positioning of valve stem 106a by the portion of the cam 95 that does not have the lobe. In this manner, a letter can be taken from the tray 23 by head 26 due to the vacuum at gripping member 87. At the same time, head 27 is being supplied pressurized air through its conduit 84 as the stem 105a of valve 105 is positioned by the lobe 95a on the cam 95 to connect conduit 84 to the air conduit 110 to discharge air through gripping member 87.

Thus, since cam 95 is rotated in timed relation to the barrel cam 40 and has a single lobe, it can be seen that when one singulator head is connected to vacuum to pick up a letter, the other singulator head is pressurized to discharge a letter onto the easel. One cam, therefore, conveniently controls the air and vacuum to a pair of singulator heads in timed relation to the action imparted by barrel cam 40.

The valve stem 107a of valve 107 is positioned by the cam 96 to simultaneously connect the air supply conduit 110 to the conduits 71 of both power cylinders 70 to move the pistons 72 outwardly to engage and swing the letter-gripping members 87 outwardly or to the right in FIG. 10. This outward movement of the member 87 of each head takes place twice during one revolution of cam 96, that is, at the time the head is picking up a letter in its lowered position and at the time it is discharging a letter onto easel 28. Since cams 95 and 96 are both rotated by shaft 92, the action of piston 72 is in timed relation to the application of air and vacuum as hereinbefore described.

The valve stem 108a of valve 108 is positioned by cam 97 so that the valve 108 connects the air supply conduit 110 to an air cylinder 112 which, as best seen in FIG. 2, is mounted in fixed position between the cam support 91 and an hydraulic control valve 113 and has a piston rod 112a. Again the positioning of the valve 108 is in timed relation to the positioning of valves 106 and 107 since all the cams are mounted on shaft 92.

Figure 13:
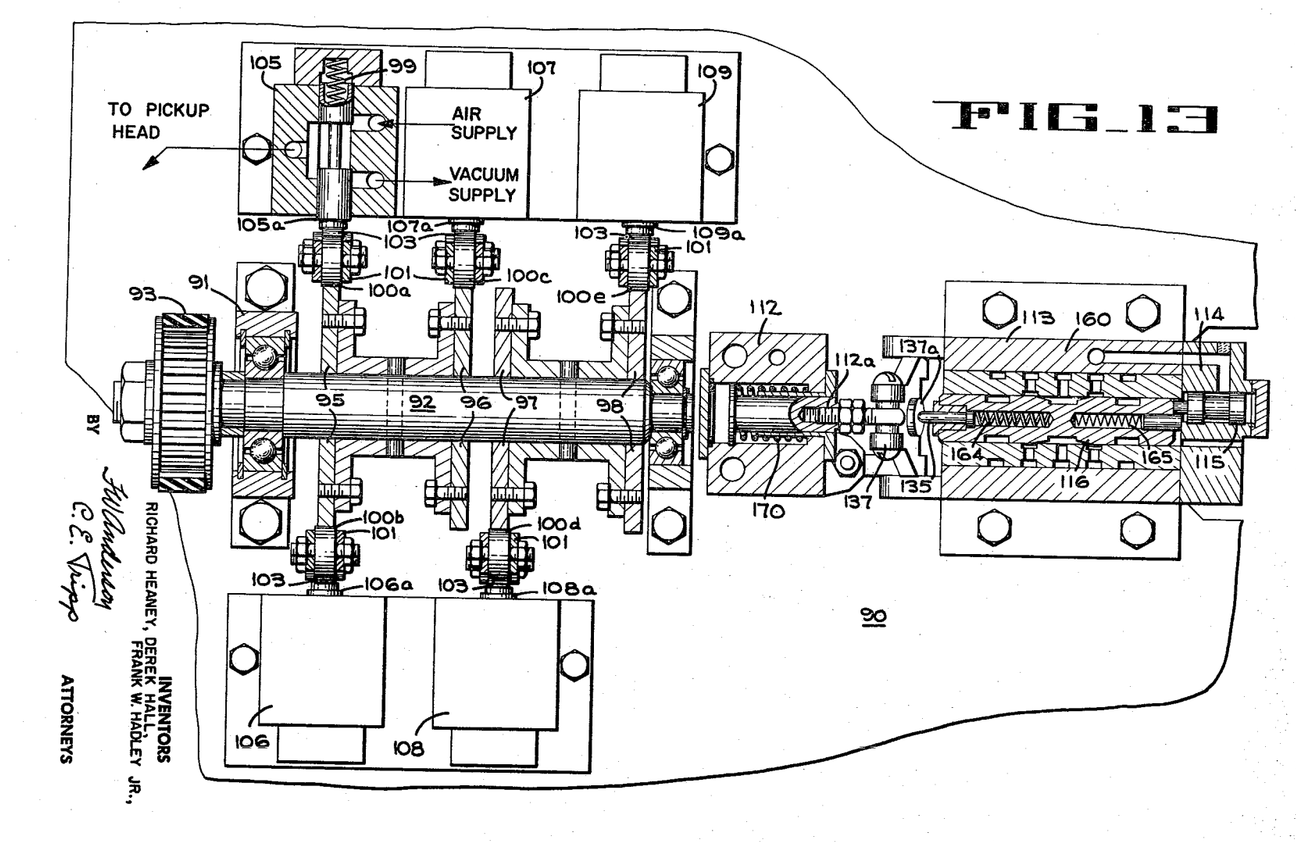
FIGURE 13 is a partial sectional view taken along 13—13 of FIG. 3.
Figure 14:
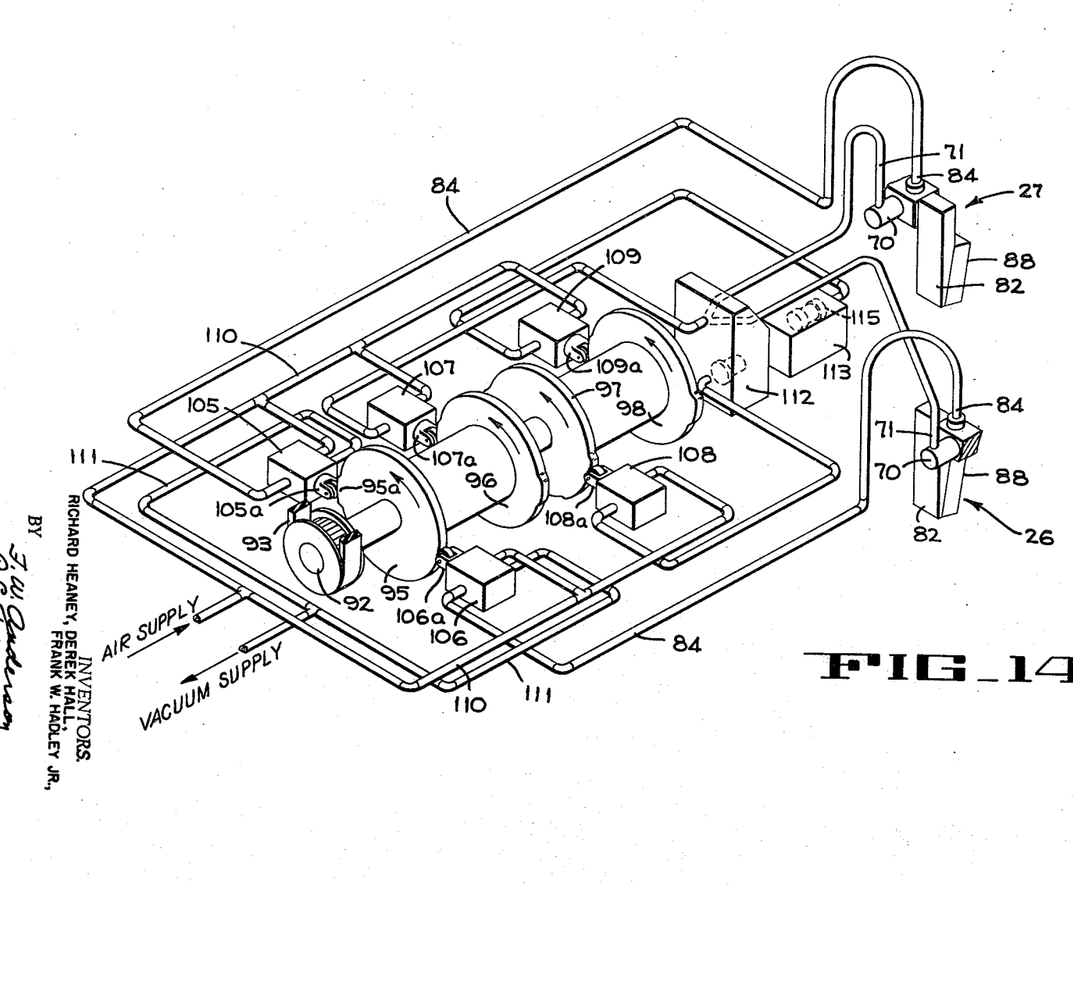
FIGURE 14 is a diagrammmatic view of a pneumatic circuit of a singulator of FIG. 2.

The valve stem 109a of valve 109 is positioned by the cam 98 so that the valve 109 connects the air supply conduit 110 to an air cylinder 114 which, as seen in FIG. 13, has a plunger 115 that may be moved into engagement with one end of the spool 116 of the valve 113 to control the valve in a manner to be described hereinafter.

Thus, the rotation of barrel cam 40, and the rotation of shaft 92 in timed relation thereto, results in cams 95, 96, 97 and 98 being rotated in timed relation to the action of singulator heads 26, 27. The valves 105, 106, 107, 108 and 109 are activated in a predetermined sequence to supply the necessary air and vacuum in conjunction with the rapid movement of the singulator heads 26 and 27 to rapidly pick up letters one at a time and deposit them on the easel 28 as the tray is being fed to the singulator.

To be considered next is the manner of conveying the trays 23 along conveyor channel 22 to the letter singulator heads so that the movement and positioning of the tray can also be in timed relation to the removal of letters from the trays by the letter singulator heads.

As previously mentioned, in order to bring a tray 23 of letters into position for letter singulation, the tray conveyor channel is provided with a plurality of rollers of a roller conveyor 24. Two of the rollers, designated as 124 and 125 in FIG. 2, are powered by a hydraulic motor 131 actuated in accordance with a hydraulic control circuit to move a tray 23 and the letters therein in timed relation to the actuation of the singulator heads 26, 27. A plurality of overhead rollers 123 engage the upper side edges of the trays and urge them downwardly into driven engagement with the rollers 124 and 125.

The rollers 124 and 125 are driven by an intermediate roller 132 and gears 133 that are rotated by the hydraulic motor 131, through appropriate means in a direction determined by the flow of hydraulic fluid from a source 134 pressurized liquid, through lines 129 and 130 (FIG. 15) as influenced by the position of the control valve 113 and a flow divider valve 127.

The valve 113 has a plunger 135 arranged to be engaged by an extension 137a of one link 137 (FIG. 2) of a parallelogram linkage which includes links 137 and 138 that are pivoted to the housing of valve 113 and to a base member 139 to which the sensing device 25 is bolted.

The sensing device 25 includes three fingers 145, 146 and 147 (FIG. 3) each of which has a downturned portion 148 (FIG. 2) with a rearwardly slanted face 149, and a rearwardly extending portion 150 that is provided at its end with a slot. A bracket 152, to which the base member 139 of the parallelogram linkage is secured, extends into the slot of each finger and is secured thereto as by a capscrew.

Figure 15:
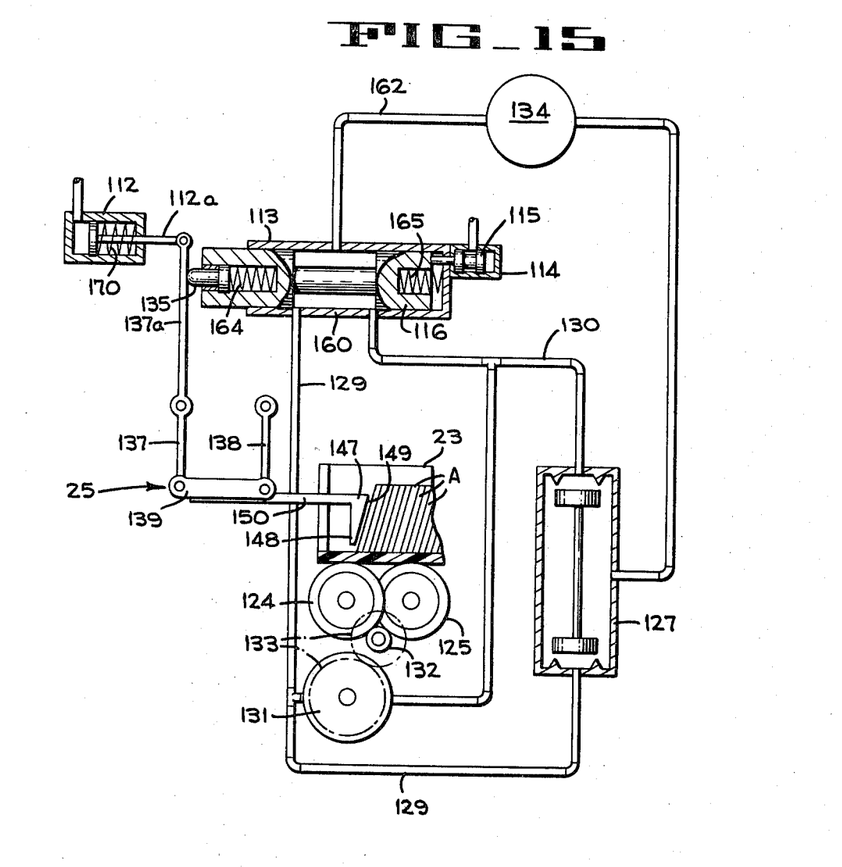
FIGURE 15 is a diagrammatic view of the hydraulic circuit of the singulator of FIG. 2.
Figure 16:
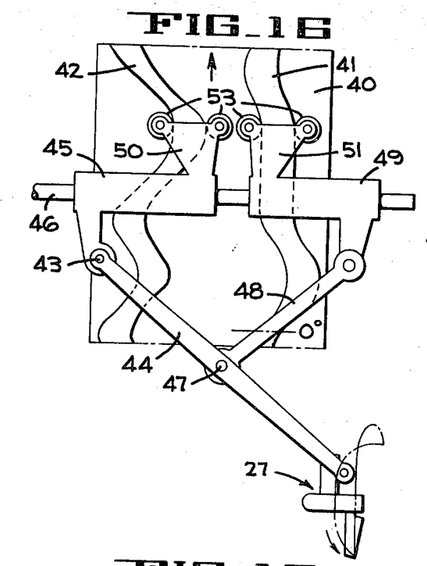
FIGURES 16–19 are diagrammatic views showing sequential operational steps of the compound movement of a singulator head as it transfers envelopes from the pickup position to the discharge position.

A particular feature of the invention is the control apparatus shown schematically in FIG. 15, particularly the valve 113 and the power cylinders 112 and 114. The valve 113 includes a housing 160 in which the spool 116 is slidably positioned. When the spool is in the centered or neutral position of FIGS. 13 and 15, fluid pumped through lines 129 and 130 will be returned by a conduit 162 to the source 134. If the plunger 135 is moved to the right by the link extension 137a, it acts through a stiff spring 164 to shift the spool to the right, and compresses a relatively weak spring 165. The line 129 is thus closed by the spool. Since flow through line 130 continues, the valve element of the flow divider is shifted to close line 130, causing all fluid to be pumped through line 129 and then through the motor 131 to rotate the motor shaft and the rollers 124 and 125 in a clockwise direction. Accordingly, when the plunger 135 is depressed, the tray 23 is moved away from the sensing member 25. On the other hand, if pressure on the link extension 137a is released and the light spring 165 expands to move the spool to the left past the neutral position, the line 130 will be closed while line 129 remains open, and the fluid will be forced through the motor in the opposite direction (counterclockwise in FIG. 15) to move the tray to the left toward the sensing mamber 25.

In one operation, it is desired to keep the spool in the neutral position while moving the link extension 137a to the right a distance that would ordinarily shift the valve past neutral position. This operation is necessary when, just before the vacuum head lifts a letter from the tray, the sensing fingers are withdrawn to the left far enough to permit movement of the letter to the left by the vacuum head without causing the letter to engage the fingers and be stripped therefrom. To keep the spool in centered position during this excessive movement of the link extension 137a, the power cylinder 114 is energized to project its piston rod into blocking engagement with the spool. With the movement of the spool blocked the relatively heavy spring 164 compresses permitting the excessive movement of link extension 137a.

The link extension 137a is given this extra movement toward the left by energizing power cylinder 112 to move the piston rod 112a to the right against the resistance of a spring 170 in the cylinder. When the cylinder 112 is de-energized, the spring 170 cooperates with the spring 165 of valve 113 to urge the piston rod 112a toward the left until the spool of valve 113 is to the left of the neutral position and the tray is moved toward the left.

As mentioned above, when the cylinder 112 and the cylinder 114 are energized simultaneously, the sensing fingers are withdrawn but the tray is not moved since the neutral position of valve 113 is maintained. Since the letters in the tray behind the foremost letter being gripped by the vacuum head have a tendency to create a frictional grip between the foremost letter and the letter next behind, it is sometimes desirable to remove the pressure of the pack at this cirtical interval when the vacuum head is about to withdraw the foremost letter. This can be accomplished by so arranging the cams 97 and 98 that the cylinder 112 is energized at a very short time before cylinder 114 is energized. Referring to FIG. 15 it will be noted that if cylinder 114 is not energized at this time, the spool will be moved past neutral position to partly close conduit 129, causing rollers 124 and 125 to rotate clockwise and move the tray away from the vacuum head. If cylinder 114 is energized very shortly after the tray starts moving away from the vacuum head, the spool of valve 113 will be promptly restored to neutral position but the pressure of the letters in the tray will have been removed from the rear face of the foremost letter and an adhesion between the foremost letter and the stack will be reduced or completely broken.

Referring to FIGS. 6 and 7 the path of movement of the vacuum head as it travels between the letter pick up position and the letter discharge position is shown in center lines. Since the heads 26 and 27 travel along identical paths, only the path of head 26 will be described. As previously described in connection with FIG. 10, when power cylinder 70 is energized, the article-contacting member 87 is moved outwardly on its parallelogram support linkage, and when cylinder 70 is de-energized, the spring 89 draws the member 87 back to its initial position. Referring to FIG. 6, if no cylinder 70 were provided for each vacuum head, the lower tip of the head would follow the path indicated in center lines from point D upwardly along path E to point F, down to point G, and then down along path H to point D. However, in accordance with the present invention, the cylinder 70 is provided to give extra movement of the vacuum head at the pick up station and at the discharge station. Accordingly, at point F during upward movement of the head along path E, the cylinder 70 is energized to move the member 87 outwardly so that it follows the dotted line J to an advanced discharge point G'. As soon as the letter has been discharged onto easel 28, cylinder 70 is de-energized and the member is retracted. During downward movement along path H, the cylinder 70 is energized when the head reaches point K so that the member 87 is moved outwardly and follows dotted path M to an advanced pick-up point D'. When the sensing fingers have been withdrawn from contact with the pack, the cylinder 70 is de-energized, and the member 87 snaps back to point D. This snap-back action results in a clean separation of the foremost letter from the letter next behind.

In describing the operation of one head of the singulating machine, the position shown in FIG. 15 will be used as a starting point. In this position, the vacuum member 87 has been moved to its extended pick-up position D', the forward face of the sensing fingers are in substantially planar alignment with the face of member 87 and the foremost letter in the tray is in engagement with the vacuum member 87 and with the three sensing fingers 145, 146 and 147. It should be noted that this position of fingers 148 corresponds to the neutral position of the spool of valve 113, and it was the leftward movement of the fingers under the urging of the advancing letters on the tray that moved the spool to said neutral position.

Continued rotation of shaft 92 causes cam 97 to actuate valve 108 and direct pressurized fluid to power cylinder 112 to pivot link extension 137a clockwise to retract the sensing fingers. Simultaneously with the energizing of cylinder 112, or a short time thereafter if a slight retraction of the tray is desired, the cam 98 actuates valve 109 to energize cylinder 114 to hold the spool of valve 113 in neutral position, or to return it to neutral position. When the sensing fingers have been retracted, the pressure in the cylinder 70 of the vacuum head is released, causing the member 87 to snap back, under the urging of spring 89, from pick-up position D' to position D. When the member 87 reaches point F, the cylinder 70 is again pressurized to move member 87 outwardly so that it arrives at discharge position G'. When member 87 reaches point L, the cam 95 actuates valve 106 to force air through the vacuum head to blow the letter toward the easel 28. When point G' is reached, the pressure in cylinder 70 is released and the member 81 snaps back as the head moves rearwardly along line H. When the head reaches point N, the cam 95 shifts the spool of valve 106 to shut off the air supply conduit 110 and connect the vacuum conduit 111. Thus, as the head continues downwardly along line H the head is vacuumized. At point K, the cylinder 70 is again energized and the member 87 is moved outwardly so that continued movement of the head brings the member 87 to the advanced pick-up position D'.

It should be noted that, since the sensing fingers 145, 146 and 147 were withdrawn to prevent them from stripping the letter from the vacuum head, they can be advanced again as soon as the head has started upwardly along path E. Thus, as soon as the letter has been raised to a sufficient height, the cylinder 112 is de-energized and the springs 170 and 165 pivot the link extension 137a in a counterclockwise direction to advance the sensing fingers. The action of springs 170 and 165 moves the spool of valve 113 to the left of the neutral position so that the line 130 is blocked off and the motor 131 is rotated in a direction to advance the tray and the letters therein toward the sensing fingers. As mentioned before, the advancing letters move the sensing fingers rearwardly until the spool is in the neutral position and the movement of the tray stops with the leading letter in engagement with the member 87 of the vacuum head and with the sensing fingers. The cycle is then complete.

Figure 17:
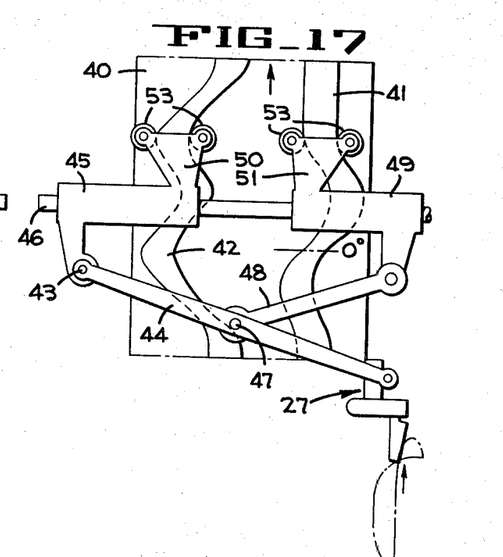
Figures 18, 19:
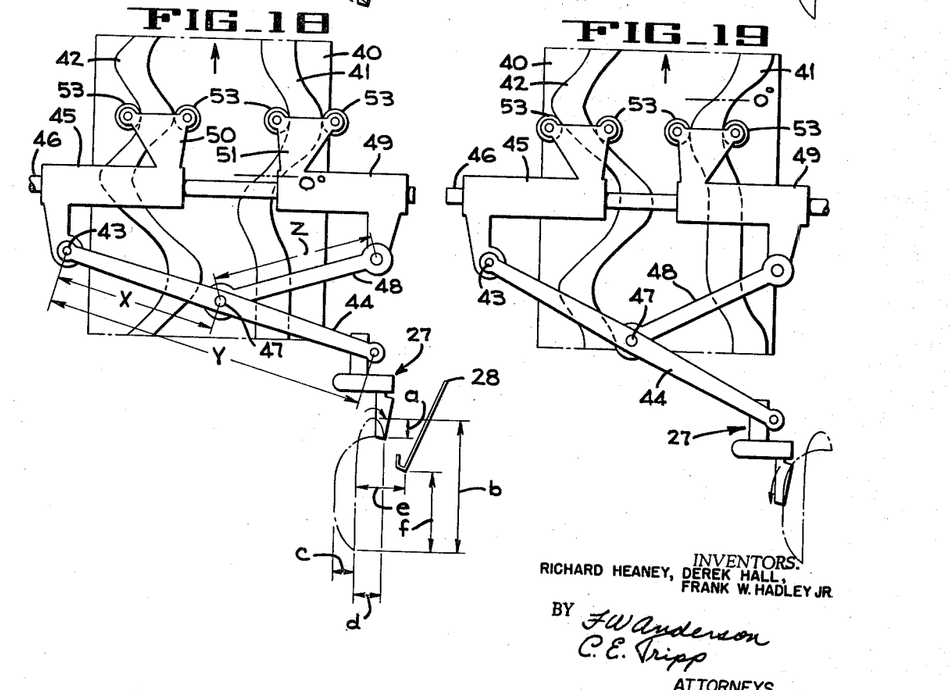

In FIGURES 16–19 a developed view of the rotary cam 40 is diagrammatically shown. With the follower rollers 53 on the cams 42 and 41 at the points indicated in FIG. 16, the vacuum head 27 will be in the lower position. If the cam is rotated so that the surface moves in the direction indicated by the arrow in FIGS. 16–19 the head will be raised as shown in FIG. 17, advanced to the right as indicated in FIG. 18, and lowered as shown in FIG. 19. The path of movement of the head shown in FIGS. 16–19 is the basic movement of the head and does not include the movement of the article-engaging member 87 under the influence of its power cylinder 70.

In one successful installation, dimension X of link 44 was 8 5/16 inches, Y was 16 5/8 inches, and Z was 8 15/16. The movement of the head was as indicated, dimension a being 1.03 inches, b being 7.497 inches, c being 1.00 inch, d being 1.50 inches, e being 2.170 inches, and f being 5.280 inches.

From the foregoing description, it will be seen that the present invention provides a letter singulating device wherein letters can be removed from a single tray at the rate of about four letters per second due to the fact that two relatively slow speed heads are arranged to service a single tray. By dividing the work between two heads, not only are the heads slowed down thus reducing inertia forces and timing difficulties, but also the letters are picked up more effectively when the movement of the heads has been slowed down. The use of the power cylinder 70 and the spring 89 at each vacuum head to effect the withdrawal of each letter from the tray with a snatching action along a line substantially normal to the plane of the rear face of the envelope, avoids any possibility of the simultaneous withdrawal of two letters since all lateral, sliding contact between the foremost letter and the letter next behind is eliminated. Further, the provision of means for backing off the tray just prior to the snapback of the vacuum head makes it possible to relieve substantially all of the forward pressure that might cause the trailing letter to cling to the letter being withdrawn.

Having thus described the invention, what is claimed as new and desired to be protected by Letters Patent is:

1. Apparatus for arranging in single file envelopes and the like that are disposed on edge in a row in flat, abutting contact comprising a pick-up head, means for manipulating the row of abutting envelopes to move the foremost envelope to a pick-up station adjacent said head to be gripped thereby, a linkage connected to said head, power means connected to said linkage to move said head between said pick-up station and an elevated discharge station, said head comprising a support member connected to said linkage, an article-contact element movably mounted on said support member, and actuating means connected between said support member and said article-contact element for moving said element to an extended position on said support member and returning it to a retracted position on said member whereby the effective movement of the linkage can be increased at selected portions of the linkage movement by moving said element away from said support member.

2. Apparatus according to claim 1 wherein said actuating means includes a power cylinder and a spring connected between said support member and said article-element.

3. Apparatus according to claim 1 wherein said linkage includes a pair of pivotally interconnected links, and wherein said head is connected to an end portion of one of said links.

4. Apparatus according to claim 1 wherein said linkage includes a pair of control members mounted for reciprocating movement in opposite directions, a relative short link pivoted to one of said control members, a relatively long link pivoted to the other control member, said short link being pivotally connected to an intermediate portion of said long link.

5. Apparatus according to claim 4 wherein said power means includes a rotary cam operatively connected to said control members to reciprocate said members.

6. Apparatus according to claim 1 wherein said envelope-manipulating means includes a tray in which the envelopes are disposed and a conveyor supporting said tray.

7. Apparatus according to claim 1 including control means for operating said actuating means before said head reaches the pick-up station for moving said article-contact element to extended position away from said support member, accelerating said element rearwardly to retracted position when said element has gripped the foremost letter at the pick-up station, and again moving said element to extended position just prior to the time said element reaches the discharge station.

8. In a combination, a carrier movable with reciprocatory movement and adapted to support a stack of abutting flat articles such as letters disposed on edge in a row on said carrier, means for positioning a vacuum head at a pick up station in the path of forward movement of articles on said carrier, a sensing member movable out of contact with the foremost of said articles when the said vacuum head is in contact with the foremost article at the pick up station, power means for reciprocating said carrier, means for moving said sensing member to and from a position forwardly of the pick up station and in the path of the articles in said carrier, means for energizing said power means for advancing said carrier to move the articles into engagement with said sensing member to push said member rearwardly, and means responsive to rearward movement of said sensing member for de-energizing said power means to stop the advancing movement of said carrier when the foremost article reaches the pick-up station.

9. Apparatus according to claim 8 wherein said means for energizing said power means includes an hydraulic motor operatively connected to said carrier, a source of fluid under pressure, a conduit communicating said pressure source with said motor, a valve disposed in said conduit and including a valving element arranged to open and close said conduit, and a first spring bearing against said valving element to urge it to a position opening said conduit and permitting pressurized fluid to flow to said motor to rotate said motor in a direction to advance said carrier.

10. Apparatus according to claim 8 including means for retracting said sensing member from the pick-up station when the foremost article reaches said station.

11. Apparatus according to claim 10 wherein said power de-energizing means includes a lever system connected to said sensing member and said retracting means includes said lever system and a power cylinder operatively connected to said lever system.

12. In combination, a carrier movable with reciprocatory movement and adapted to support a stack of abutting flat articles such as letters disposed on edge in a row on said carrier, means for positioning a vacuum head at a pick-up station in the path of forward movement of articles on said carrier, a sensing member movable along a path generally in alignment with the path of movement of the articles, power means for reciprocating said carrier, means for moving said sensing member to a position forwardly of the pick-up station and in the path of the articles in said carrier, means for energizing said power means for advancing said carrier to move the articles into engagement with said sensing member to push said member rearwardly, said means for energizing said power means including an hydraulic motor operatively connected to said carrier, a source of fluid under pressure, a conduit communicating said pressure source with said motor, a valve disposed in said conduit and including a valving element arranged to open and close said conduit, and a first spring bearing against said valving element to urge it to a position opening said conduit and permitting pressurized fluid to flow to said motor to rotate said motor in a direction to advance said carrier, and means responsive to rearward movement of said sensing member for de-energizing said power means to stop the advancing movement of said carrier when the foremost article reaches the pick-up station, said power de-energizing means including a lever system operatively connected between said sensing member and said valving element and further including a power cylinder connected to said lever system for retracting said sensing member from the pick-up position, a second spring operatively connected between said lever system and said valving element, said second spring being stiffer than said first spring and arranged to transmit to said valving element the movement of said lever system when said sensing member is moved rearwardly by the advancing stack of articles and to thereby compress said first spring as said valving element reaches the position for stopping the advance of said carrier.

13. The apparatus of claim 12 including a retractable stop member movable to a position of abutting contact with said valving element when said element is in said carrier-stopping position, means for energizing said power cylinder to move said lever system to retract said sensing member when said stop member is in engagement with said valving element, said second spring being arranged to be compressed between said stationary valving element and said lever system to permit retraction of said sensing member without effecting movement of said valving element from said carrier-stopping position.

14. Apparatus for separating the foremost article of a stack of articles that are supported on edge and have generally flat faces in abutting contact comprising means for positioning the foremost article at a pick up station, a vacuum head at said station arranged to grip the foremost article, means for moving the stack rearwardly away from said vacuum head after the foremost article is gripped to break the partial vacuum seal existing between the said foremost article and the article next behind, and an actuating mechanism connected to said head and arranged to accelerate said head quickly away from the stack along a path substantially normal to the plane of contact between the rear face of the foremost article and the forward face of the article next behind.

15. In a method of separating the foremost article from a stack of articles wherein the articles have flat abutting faces disposed in face-to-face contact and the stack is lying on its side, the steps of gripping the foremost article, moving the stack rearwardly after the foremost article has been gripped to break the partial vacuum seal existing between the said foremost article and the article next behind, then quickly accelerating said foremost article directly away from the article next behind along a path substantially normal to the plane of the flat face of said article next behind.

References Cited

UNITED STATES PATENTS

| | | |
|---|---|---|
| 3,386,558 | 6/1968 | Benatar. |
| 3,415,388 | 12/1968 | Hornlein. |
| 3,146,902 | 9/1964 | Voelker. |
| 3,176,978 | 4/1965 | Baker. |
| 3,285,606 | 11/1966 | Johnson. |
| 3,391,806 | 7/1968 | Geis. |

ROBERT G. SHERIDAN, Primary Examiner

GEORGE F. ABRAHAM, Assistant Examnier

U.S. Cl. X.R.

198—20; 214—152; 271—26